United States Patent

Lounsbury et al.

[11] Patent Number: 5,826,845
[45] Date of Patent: Oct. 27, 1998

[54] SUPPORT STRUCTURE FOR A RESERVOIR IN A MOTOR VEHICLE

[75] Inventors: Denice Lounsbury, Novi; Casimir Barnosky, Waterford; Ulderico Padovini, Utica; Bernita Grigsby, Detroit; Ronald Huszarik, Clawson, all of Mich.

[73] Assignee: Chrysler Corporation, Auburn Hills, Mich.

[21] Appl. No.: 751,803

[22] Filed: Nov. 19, 1996

[51] Int. Cl.⁶ ................................................ A47B 96/06
[52] U.S. Cl. ................................. 248/224.61; 248/635
[58] Field of Search ............................... 248/154, 200, 248/205.1, 224.61, 311.2, 313, 603, 608, 609, 635

[56] References Cited

U.S. PATENT DOCUMENTS

| | | | |
|---|---|---|---|
| 1,784,716 | 12/1930 | West | 248/313 |
| 2,673,057 | 3/1954 | Morris, Sr. | 248/311.2 |
| 3,033,403 | 5/1962 | Adell | 215/1 |
| 3,033,404 | 5/1962 | Adell | 215/1 |
| 3,033,405 | 5/1962 | Adell | 215/1 |
| 3,212,660 | 10/1965 | Adell | 215/1 |
| 3,212,661 | 10/1965 | Adell | 215/1 |
| 3,533,526 | 10/1970 | Adell | 215/56 |
| 3,614,982 | 10/1971 | Krizman | 165/51 |
| 3,840,944 | 10/1974 | Gresley | 24/73 R |
| 4,191,351 | 3/1980 | Goyne | 248/311.2 |
| 4,346,865 | 8/1982 | Murata | 248/311.2 |
| 4,377,933 | 3/1983 | Lojou | 60/39.08 |
| 4,424,829 | 1/1984 | Millington et al. | 137/590 |
| 4,465,254 | 8/1984 | Murata et al. | 248/311.2 |
| 4,887,812 | 12/1989 | Moormann | 248/224.61 |
| 5,098,054 | 3/1992 | Dyer | 248/313 |
| 5,280,868 | 1/1994 | Ueno et al. | 248/205.1 |
| 5,303,896 | 4/1994 | Sterka | 248/635 |
| 5,356,105 | 10/1994 | Andrews | 248/224.61 |
| 5,431,363 | 7/1995 | Ezzat et al. | 248/205.1 |
| 5,464,187 | 11/1995 | Linkner, Jr. | 248/635 |
| 5,533,704 | 7/1996 | Fischinger et al. | 248/603 |

*Primary Examiner*—Leslie A. Braun
*Assistant Examiner*—Anita King
*Attorney, Agent, or Firm*—Roland A. Fuller, III

[57] ABSTRACT

A support structure for a reservoir in a motor vehicle includes a mounting face for mounting to a vehicle body of the motor vehicle, a positioning face extending outwardly from the mounting face, a receiving face extending outwardly from the positioning face and including an opening having opposed sides with each forming an outwardly extending flange for receiving an engaging member positioned on an exterior surface of the reservoir, and the mounting face and the positioning face and the receiving face being unitary and integral as one-piece. The reservoir includes a housing having an engaging member positioned on an exterior surface thereof and forming a channel for receiving flanges on each side of an opening formed in the receiving face.

9 Claims, 2 Drawing Sheets

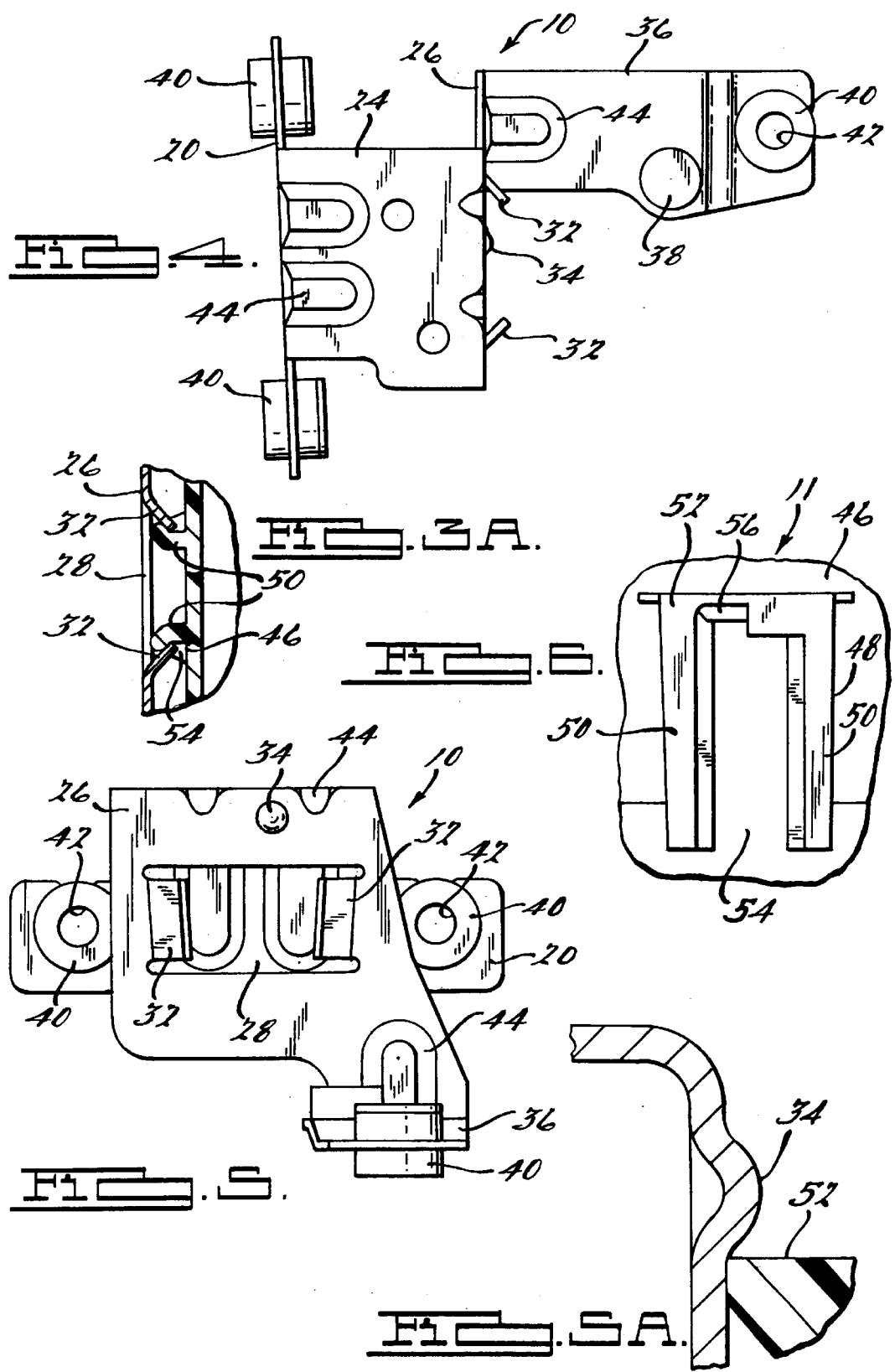

SUPPORT STRUCTURE FOR A RESERVOIR IN A MOTOR VEHICLE

BACKGROUND OF THE INVENTION

1. Field of the Invention

The present invention relates generally to support structures and, more particularly, to a support structure for a reservoir in a motor vehicle.

2. Description of the Related Art

Various components in a motor vehicle utilize a fluid in their operation, including a power steering system, a brake system, and a windshield washer system. These components may also rely on a reservoir for maintaining a supply of fluid. The reservoir may be mounted directly to the vehicle, or onto a support structure that is attached to the vehicle. For example, within an engine compartment of the motor vehicle, the reservoir may be attached directly to the engine of the motor vehicle.

Several factors influence the mounting of the reservoir. Serviceability may require that the reservoir be positioned so that it is accessible or removable. Also spatial constraints within the motor vehicle often limit the attachment location of the reservoir.

For the power steering system, a support structure for the reservoir was constructed from two pieces and welded together for attachment to the vehicle body. One piece of the support structure is rigid, and the other is flexible. For example, spring steel may be used for the flexible piece due its characteristic deformability. Although this two-piece construction worked well, it suffers from the disadvantage of being relatively expensive due to the cost of material and manufacturing.

Another example includes a support structure having an elastically deformable locking mechanism. This construction also works well, but likewise suffers the disadvantage of being relatively expensive due to the cost of material. A further disadvantage is the need for a tool to unlock the locking mechanism to detach the reservoir. Thus, there is a need in the art for a one piece support structure for a reservoir capable of rigidly supporting the reservoir while maintaining accessibility to the reservoir.

SUMMARY OF THE INVENTION

It is, therefore, one object of the present invention to provide a new and improved snap-in and lock support structure for a reservoir.

It is another object of the present invention to provide a support structure for a reservoir mounted to a body of a motor vehicle.

It is yet another object of the present invention to provide a reservoir that is detachable from a support structure.

It is still another object of the present invention to provide a support structure capable of rigidly supporting a reservoir.

It is a further object of the present invention to provide a support structure capable of maintaining accessibility to a reservoir in an engine compartment of a motor vehicle.

It is further object of the present invention to provide a reservoir that can be manually assembled without tools to the support structure.

To achieve the forgoing objects, the present invention is a support structure for a reservoir in a motor vehicle. The support structure includes a mounting face for mounting to a vehicle body of the motor vehicle and a positioning face extending outwardly from the mounting face. The support structure also includes a receiving face extending outwardly from the positioning face and including an opening with opposed sides with each forming an outwardly extending flange for receiving an engaging member positioned on an exterior surface of the reservoir. The mounting face and the positioning face and the receiving face are unitary and integral as one-piece.

One advantage of the present invention is that a new and improved support structure for a reservoir is provided that is made of a one piece stamped construction from a metal such as steel. Another advantage of the present invention is that the support structure is positioned within a motor vehicle and can be attached to a vehicle body of the motor vehicle. Yet another advantage of the present invention is that a reservoir is provided that is easily installable and removable from the support structure without the use of a tool. Still another advantage of the present invention is that the support structure includes a rigid locking mechanism that holds the reservoir in tension. A further advantage of the present invention is that the support structure includes flanges for supporting the reservoir while rigidly retaining the reservoir.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 3A is a sectional view taken along line 3A—3A of FIG. 3.

FIG. 4 is a plan view of the support structure of FIG. 1.

FIG. 5 is an elevational view of the support structure of FIG. 1.

FIG. 5A is a partial fragmentary view of a lock dimple for the support structure of FIG. 5.

FIG. 6 is an elevational view of an engaging member for the reservoir of FIG. 3.

FIG. 7 is a perspective view of another embodiment, according to the present invention, of the support structure of FIG. 1.

DESCRIPTION OF THE PREFERRED EMBODIMENT(S)

Figure 1:
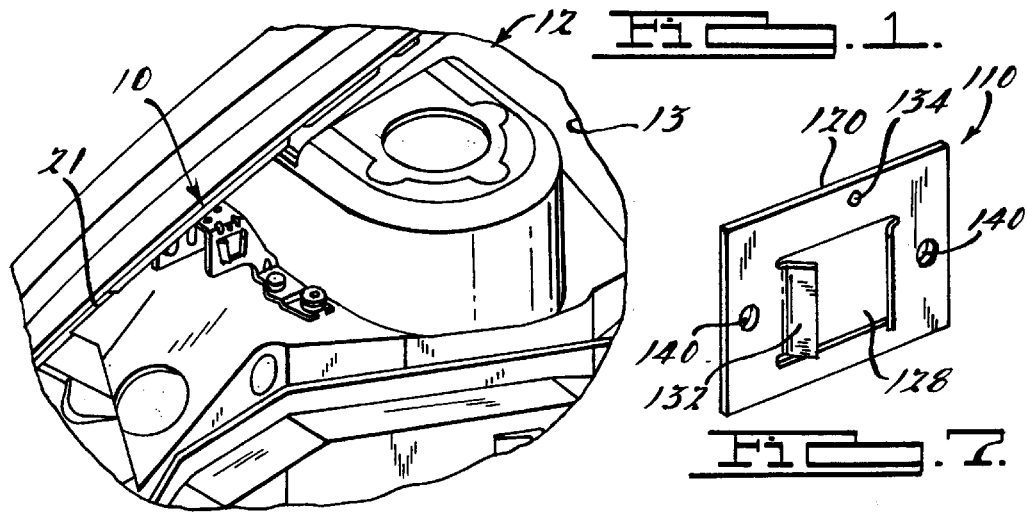
FIG. 1 is a perspective view of a support structure, according to the present invention, mounted to a vehicle body of a motor vehicle.
Figure 3:
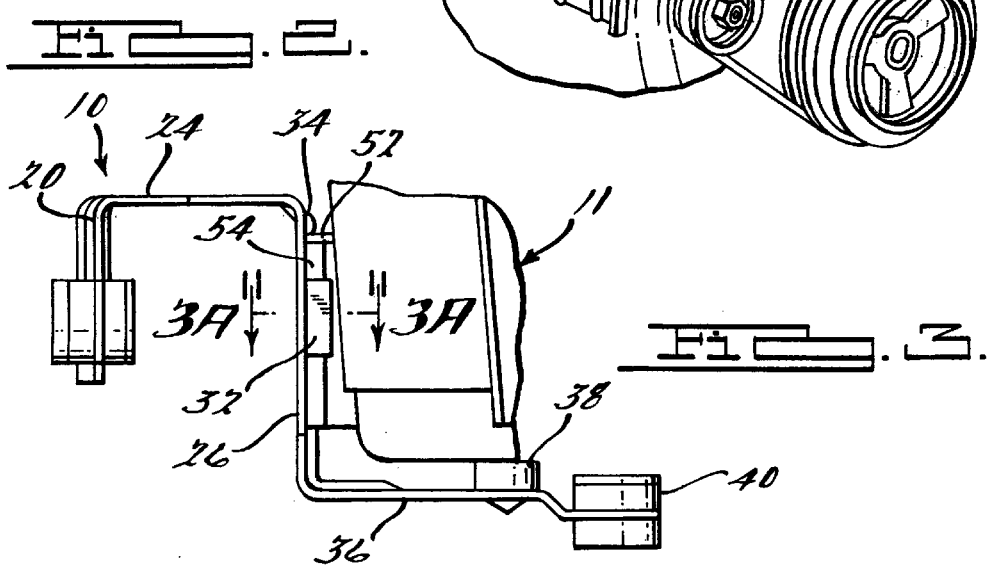
FIG. 3 is a side view of a reservoir mounted to the support structure of FIG. 1.

Referring to FIG. 1, a support structure 10, according to the present invention, is illustrated for supporting a reservoir 11 (FIG. 3) in a motor vehicle 12. In this example, the support structure 10 supports a power steering reservoir 11 for a power steering system of the motor vehicle 12. Typically, the power steering reservoir 11 is positioned within the motor vehicle 12 so that it is accessible for installation and removal, such as in an engine compartment 13 of the motor vehicle 12. It should be appreciated that within the engine compartment 13, vehicle components compete for limited space.

Figure 2:
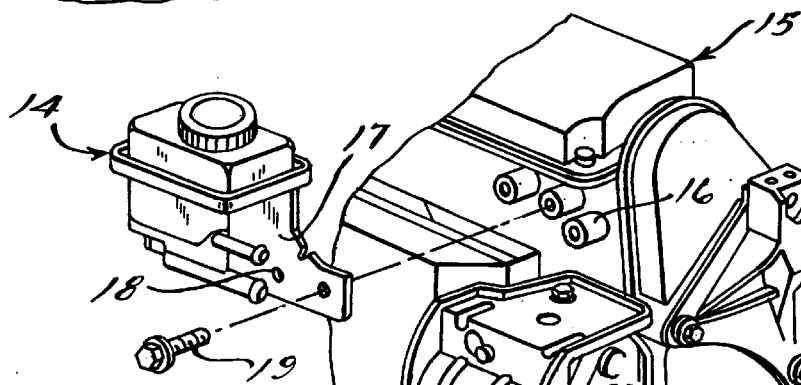
FIG. 2 is an exploded perspective view of a prior art reservoir mounted directly to an engine of a motor vehicle.

According to the prior art illustrated in FIG. 2, a power steering reservoir 14 may be attached directly to an engine 15 of the motor vehicle 12. The engine 15 includes at least one engaging surface or boss 16 for attachment of the power steering reservoir 14. The power steering reservoir 14 includes a mounting surface 17 having at least one aperture 18 extending therethrough for receiving a fastener 19 to secure the reservoir 14 to the engaging boss 16 of the engine 15. It should be appreciated that a potential disadvantage of this attachment is that roll of the engine 15 could affect the operation of the power steering reservoir 14.

Referring to FIGS. 3, 3A, 4, 5, 5A, and 6, the support structure 10 for the power steering reservoir 11 is illustrated. The support structure 10 of this example is generally C-shaped. The support structure 10 includes a mounting face 20 for mounting or attachment to a vehicle body 21 illustrated in FIG. 1. The support structure 10 includes a positioning face 24 extending outwardly and perpendicularly from an end of the mounting face 20. The positioning face 24 locates the reservoir 11 away from the vehicle body 21, for example, to avoid interfering with another component. The support structure 10 includes a receiving face 26 for receiving and supporting the reservoir 11, extending outwardly and perpendicularly to the positioning face 24 and parallel to the mounting face 20. It should be appreciated that the shape of the support structure 10 is determined by spatial availability within the motor vehicle 12.

The receiving face 26 includes an opening 28. In this example, the opening 28 has a generally rectangular shape. The receiving face 26 includes an outwardly extending flange 32 on each side of the opening 28 for engaging a receiving portion to be described of the power steering reservoir 11. The receiving face 26 includes an outwardly projecting lock dimple 34 positioned adjacent the opening 28. The lock dimple 34 is a rigid, non-deformable member in conjunction with the reservoir chamfer 56 that allows ease of assembly and prevents undesirable movement of the power steering reservoir 11 retained in the support structure 10. It should be appreciated that, in this example, the lock dimple 34 has a generally circular shape.

The retaining face 26 includes a stabilizing leg 36 extending outwardly and perpendicularly to the receiving face 26 for stabilizing and supporting the reservoir 11. The stabilizing leg 36 includes an integral isolating support mechanism 38 such as a rubber grommet. The isolating support mechanism 38 provides a surface for the power steering reservoir 11 to rest on and acts as a damping mechanism between the power steering reservoir 11 and the support structure 10. The power steering reservoir 11 tends to move in a pulsating manner because of fluid flow through the power steering reservoir 11 during vehicle operation. This pulsing noise can be transmitted through the support structure 10 and to the motor vehicle 12. The damping ability of the isolating support mechanism 38 inhibits the transfer of a dynamic force, such as the pulsing noise, induced by the fluid flow to the motor vehicle 12.

In an alternative embodiment (not shown), the support structure 10 does not include a stabilizing leg 36 because the support structure 10 is of sufficient structural strength to support the power steering reservoir 11 in a cantilevered position.

The support structure 10 includes an isolating sleeve mechanism 40, such as a rubber grommet, retained within an aperture (not shown) of the stabilizing leg 36. The isolating sleeve mechanism 40 of this example is well known in the art and has a cylindrical shape with an aperture 42 extending therethrough for receiving a fastener (not shown), such as a bolt, for attaching the support structure 10 to the vehicle body 21. The support structure 10 also includes two isolating sleeve mechanisms 40 in the mounting face 20. The isolating sleeve mechanism 40 includes a circumferential groove (not shown) for interferencingly fitting within a perimeter of the aperture in the support structure 10. The isolating sleeve mechanism 40 also includes a sleeve, not shown but well known in the art, fitting within the opening 42 to protect the isolating sleeve mechanism 40 from the fastener. Preferably, the sleeve is made of a metal material.

The support structure 10 may include a rib 44 to provide structural strength to the support structure 10. For example, the support structure 10 may have a rib 44 formed in the support structure 10 at the intersection of two faces, such as the mounting face 20 and the positioning face 24 and the receiving face 26 and the stabilizing leg 36.

Referring to FIGS. 2, 3A and 6, the power steering reservoir 11 includes a housing 46 for holding a fluid, preferably of a non-metal material such as glass filled nylon. An exterior surface of the housing 46 includes an engaging member 48 for attaching to the receiving face 26 of the support structure 10. Preferably, the engaging member 48 is molded contiguous with the housing 46. The engaging member 48 of this example is generally T-shaped, and has a pair of legs 50 and an arm 52 positioned at an upper end of the legs 50. The engaging member 48 includes a channel 54 is formed between each leg 50 and the housing 46 for slidably engaging the flange 32 from the support structure 10. In this example, the channel 54 is tapered to increase the interference fit between the channel 54 and the flange 32. The arm 52 includes a chamfered portion 56 for guiding the lock dimple 34 and reducing operator or installer effort when the power steering reservoir 11 is positioned on the support structure 10.

In operation, the power steering reservoir 11 mounts to the support structure 10 by aligning the channel 54 with the flanges 32, and aligning the chamfered portion 56 with the lock dimple 34. The channel 54 is guided over the flanges 32 until an end of the flanges 32 contacts the arm 52. The lock dimple 34 is guided through the chamfered portion 56 and forcibly over the arm 52 until the arm 52 is retained between the lock dimple 34 and the flange 32 as illustrated in FIG. 5A. The lock dimple 34 imparts tension on the arm 52 to inhibit vertical movement of the power steering reservoir 11. The interference fit between the channel 54 and the flanges 32 inhibit lateral movement of the power steering reservoir 11. To remove the power steering reservoir 11 from the support structure 10, the reservoir 11 is first pulled outward so that the lock dimple 34 clears the arm 52, and the reservoir 11 is then lifted upwards.

Referring to FIG. 7, another embodiment, according to the present invention, of the support structure 10 is illustrated. Like parts of the support structure 10 have like reference numerals increased by one hundred (100). The support structure 110 includes a face 120 for mounting to the vehicle body by fasteners (not shown) which extend through apertures 140 in the face 120. The face 120 includes a lock dimple 134 and an opening 128 with a side forming a flange 132 on each side. It should be appreciated that the support structure 110 may include a stabilizing leg 36 (not shown), extending from an end of the face 120, to provide additional support to the reservoir 11. The reservoir 11 is mounted to the support structure 110 in a similar manner as the support structure 10 previously described.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. In a motor vehicle having a vehicle body and a reservoir and an improved support structure for supporting the reservoir in the motor vehicle, comprising:

a mounting face for mounting to the vehicle body of the motor vehicle;

a positioning face extending outwardly from said mounting face;

a receiving face extending outwardly from said positioning face and including an opening having opposed sides with each forming an outwardly extending flange for receiving an engaging member positioned on an exterior surface of the reservoir; and said mounting face and said positioning face and said receiving face being unitary and integral as one-piece.

2. A support structure for a reservoir in a motor vehicle, comprising:

a mounting face for mounting to a vehicle body of the motor vehicle;

a positioning face extending outwardly from said mounting face;

a receiving face extending outwardly from said positioning face and including an opening having opposed sides with each forming an outwardly extending flange for receiving an engaging member positioned on an exterior surface of the reservoir;

said mounting face and said positioning face and said receiving face being unitary and integral as one-piece; and a stabilizing leg extending outwardly from said receiving face and having an integral isolating support mechanism for the reservoir to rest upon, wherein said isolating support mechanism is a rubber grommet.

3. The support structure as set forth in claim 2 wherein said mounting face includes at least one aperture extending therethrough.

4. The support structure as set forth in claim 2 wherein said support structure is made of a metal material.

5. A support structure for a reservoir in a motor vehicle, comprising:

a mounting face for mounting to a vehicle body of the motor vehicle;

a positioning face extending outwardly from said mounting face;

a receiving face extending outwardly from said positioning face and including an opening having opposed sides with each forming an outwardly extending flange for receiving an engaging member positioned on an exterior surface of the reservoir, wherein said receiving face includes a rigid lock dimple; and said mounting face and said positioning face and said receiving face being unitary and integral as one-piece.

6. The support structure as set forth in claim 5 including a stabilizing leg extending outwardly from said receiving face and having an integral isolating support mechanism for the reservoir to rest upon.

7. A support structure for a reservoir in a motor vehicle, comprising:

a mounting face for mounting said support structure to a vehicle body of the motor vehicle, a positioning face extending outwardly from an end of said mounting face, a receiving face extending outwardly from an other end of said positioning face;

said receiving face including an outwardly projecting rigid lock dimple;

said receiving face including an opening having at least two sides, with each side of said opening forming an outwardly extending flange;

a stabilizing leg extending from said receiving face;

said stabilizing leg having an integral isolating support mechanism for the reservoir to rest upon;

an engaging member positioned on an exterior surface of the reservoir; and said engaging member having a leg and an arm perpendicular to an upper end of said leg, wherein a channel is formed between said reservoir and said leg for receiving said flange.

8. The support structure as set forth in claim 7 wherein said isolating support mechanism is a rubber grommet.

9. The support structure as set forth in claim 7 wherein said support structure is made of a metal material.

* * * * *